(12) United States Patent
Qian et al.

(10) Patent No.: US 11,379,163 B2
(45) Date of Patent: Jul. 5, 2022

(54) METHOD AND APPARATUS FOR PRINTHEAD MAINTENANCE

(71) Applicant: HEWLETT-PACKARD DEVELOPMENT COMPANY, L.P., Spring, TX (US)

(72) Inventors: Li Qian, Sant Cugat del Valles (ES); Francisco Guerrero Carvajal, Sant Cugat del Valles (ES); Secundino Vicente Vicente, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/603,560

(22) PCT Filed: Jun. 15, 2018

(86) PCT No.: PCT/US2018/037871
§ 371 (c)(1),
(2) Date: Oct. 7, 2019

(87) PCT Pub. No.: WO2019/240823
PCT Pub. Date: Dec. 19, 2019

(65) Prior Publication Data
US 2021/0365217 A1 Nov. 25, 2021

(51) Int. Cl.
*G06F 3/12* (2006.01)
*B41J 2/21* (2006.01)
*G06K 15/02* (2006.01)

(52) U.S. Cl.
CPC .......... *G06F 3/1208* (2013.01); *B41J 2/2135* (2013.01); *G06F 3/125* (2013.01); *G06F 3/1242* (2013.01); *G06K 15/027* (2013.01)

(58) Field of Classification Search
CPC ...... G06F 3/1208; G06F 3/1242; G06F 3/125; B41J 2/2135; G06K 15/027
USPC ......................................................... 358/1.15
See application file for complete search history.

(56) References Cited

U.S. PATENT DOCUMENTS

| | | | |
|---|---|---|---|
| 5,659,342 A * | 8/1997 | Lund | B41J 2/16526 347/24 |
| 8,287,066 B2 | 10/2012 | Jackson et al. | |
| 9,469,098 B2 | 10/2016 | North et al. | |
| 9,757,941 B2 | 9/2017 | Gracia Verdugo et al. | |
| 2002/0054301 A1 | 5/2002 | Iwai et al. | |
| 2007/0057983 A1* | 3/2007 | Kawaguchi | B41J 2/16526 347/9 |
| 2009/0167813 A1* | 7/2009 | Mitchell | B41J 2/16526 347/23 |

(Continued)

FOREIGN PATENT DOCUMENTS

KR          101124211 B1     3/2012

*Primary Examiner* — Kent Yip
(74) *Attorney, Agent, or Firm* — HP Inc. Patent Department

(57) ABSTRACT

In an example, there is provided a method and apparatus for generating a print output file, the method comprising receiving at least one image to be printed, determining a printing area corresponding to a region containing the at least one image to be printed and a non-printing area corresponding to a remaining region, providing a spit-on-page dot pattern limited to the non-printing area, and generating the print output file comprising the dot pattern and the at least one image.

19 Claims, 4 Drawing Sheets

(56) References Cited

U.S. PATENT DOCUMENTS

2015/0251411 A1    9/2015   Rossell et al.
2016/0350043 A1   12/2016   Hikosaka
2017/0006173 A1    1/2017   Ueda et al.

* cited by examiner

METHOD AND APPARATUS FOR PRINTHEAD MAINTENANCE

BACKGROUND

Many printers operate by ejecting printing liquid, such as an ink, from a printhead in the printer onto a printing medium in determined locations in order to print an image on the printing medium. The printing liquid used may be water or solvent based and may be stored in reservoirs or cartridges in the printer until used for printing an image. During printing, the printing liquid may be ejected through a plurality of nozzles on the printhead as the printhead passes over a printing medium. The printhead may include different nozzles for different coloured printing liquids. The printhead may move across the printing medium during the printing operation in order to deposit printing liquid onto the printing medium at the correct location for forming the image. For example, a printhead may move from one side of a track to another side of the track as the printing medium is passed beneath the printhead. The nozzles of the printhead may be capped when not in used in order to prevent evaporation of the printing liquid through the nozzles.

BRIEF INTRODUCTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
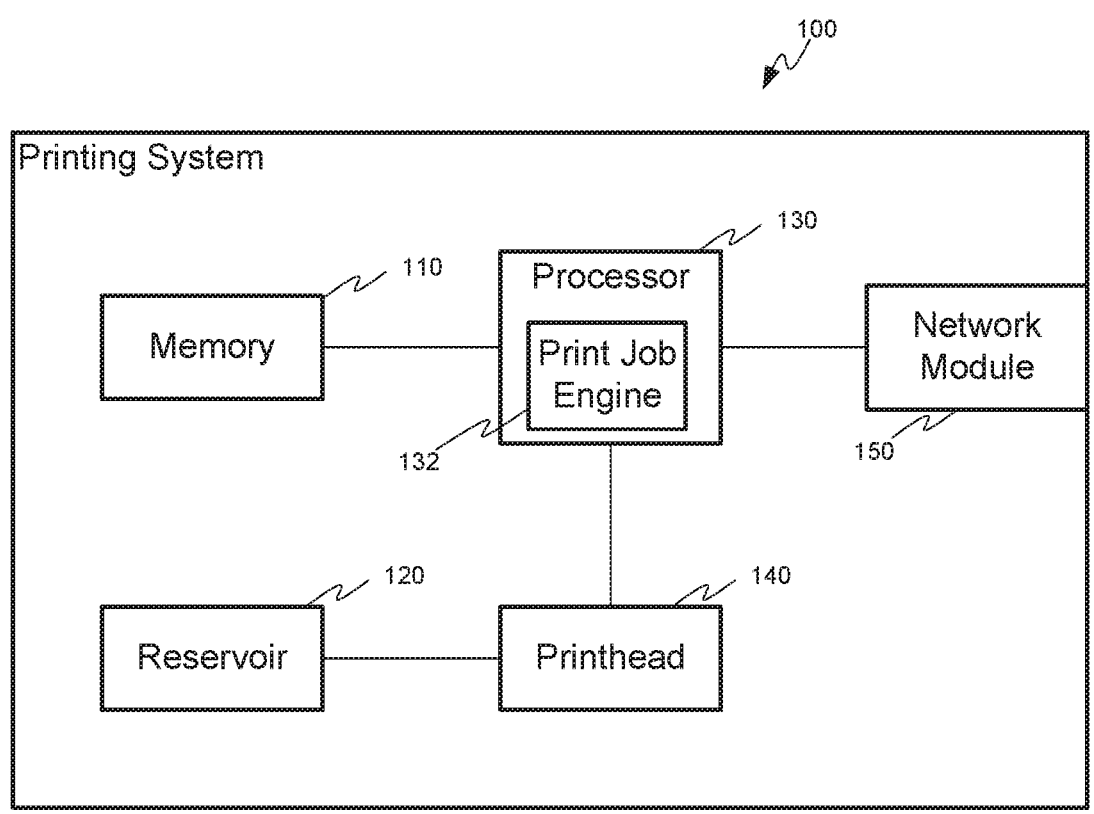
FIG. 1 shows a printing system according to an example of the disclosure.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Commercially available printers may include a printhead for ejecting printing liquid, such as an ink, through a nozzle, or a plurality of nozzles, during a printing image in order to form an image. In the case when solvent or water-based printing liquid is used, a reduction in print quality may arise due to evaporation from the nozzles between printing liquid ejection, or firing, of the nozzles, which may reduce print quality as printing liquid dries out and partially or fully clogs the nozzle. This may obstruct the passage of printing fluid as it is ejected through the nozzle. To mitigate this, nozzles may be "capped" between use to prevent evaporation through the nozzles. For example, a nozzle cap may be attached to the nozzle to cover the opening of the nozzle and form a seal to prevent exposure to external environments. As used herein, "decap" refers to a situation when a nozzle is not capped, and thus a situation where evaporation may negatively affect printing quality and nozzle health. The printing liquid drying out on the nozzle may affect printing quality as when the nozzle is desired to be used for printing an image, passage of the printing liquid through the nozzle may be obstructed by ink residue, and consequently the printing liquid may not be deposited at the correct location on the printing medium. The size of the drop of printing liquid may also be different to the desired drop size due to the level of clogging of the nozzle.

As used herein, "decap time" of a nozzle is the shorter time of i) the amount of time since a nozzle was most recently decapped or serviced; and ii) the amount of time since a nozzle most recently ejected printing liquid. It is to be understood that in some examples, servicing of the nozzle may include ejecting printing liquid through the nozzle.

A printhead may include a plurality of nozzles which may be fired independently from one another. Therefore, each nozzle may have a different decap time. For example, a nozzle corresponding to a colour or print location that is infrequently used may spend more time in a state where the nozzle is neither capped nor fired as the printhead traverses across the printing medium, which may lead to a greater impact on nozzle health and printing quality for that particular nozzle.

The effects of decap on nozzle health and print quality may be mitigated by servicing the nozzle in a servicing area or ejecting printing liquid through the nozzle. When printing liquid is ejected through the nozzle, the passage of the ejected printing liquid may remove printing liquid residue from the nozzle. The process of ejecting printing liquid through a nozzle for the purpose of cleaning the nozzle (as opposed to a desired printing operation) may be known as "spitting".

Nozzle maintenance may be performed by spitting directly onto the printing medium. For example, as the printhead traverses a printing medium, in what is known as a swath, the printhead nozzles may fire at times and locations other than those designated for forming the printed image and eject printing liquid onto the printing medium in order to clean the printhead nozzles. This technique may be known as "spit on page". Performing spit on page may mitigate rapid deterioration of nozzle health and printing quality associated with decap. For example, in the case where a nozzle is not used frequently for printing the image, spitting on the page with said nozzle may refresh the nozzle, which may increase print quality.

However, in some circumstances the dots formed on the print medium through the use of spit on page may be visible in the final printed output, depending on the texture and colour of the spat dots. In particular, certain printing technologies may be particularly susceptible to visible dots associated with spit on page. For example, in dye sublimation printing, due to the dot gain after sublimation, spat dots may be more visible than with other printing techniques.

Certain examples described herein provide methods and systems for generating printed images while reducing artefacts in the desired print output caused by spit on page operation. For example, methods may be provided to limit the spitting of spit on page dots to designated "non-printing areas" such as in space between images being printed on a print medium.

FIG. 1 shows a printing system 100 according to an example of the disclosure. The printing system 100 may include a memory 110, reservoir 120, processor 130, print job processing engine 132, printhead 140 and a network module 150. The skilled person will appreciate that a printing system 100 may comprise a number of other known components of which a description here is omitted, and that some components of the printing system 100 shown in FIG. 1 may be optional for the purposes of this disclosure.

The memory 110 may be configured to store instructions for the operation of the printing system. For example, the memory 110 may store instructions useable by the processor 130 to control the printing system 100 to print an image onto a printing medium.

Printhead 140 may include at least one nozzle for ejecting a printing liquid, such as an ink; an overcoat, a colour enhancer or the like, onto a printing medium to form an image. The printhead 140 may perform a spit on page operation to clean the at least one nozzle of the printhead 140.

The printing system may operate on a printing medium. The printing medium may be a substrate onto which the printing system 100 prints an image using the printhead 140. For example, the printing medium may be printing paper, cardboard, textiles, etc. The printing medium may be physically moved by the printing system 100. For example, the printing medium may be a plurality of pages of printing paper which are kept in a storage part of the printing system 100 and passed one at a time through a space under the printhead 140 during printing. For example, the printing medium may be moved in a direction perpendicular to the direction of movement of the printhead 140 during printing. Alternatively, the printing medium may be static during printing, and the printhead 140 may perform all desired movement to print an image.

The printhead 140 may print an image onto the printing medium according to instructions received from the processor 130. That is, the printhead 140 may operate under the control of the processor 130. The printhead 140 may be connected to reservoirs 120 or cartridges for storing printing liquid until use of the printing liquid is desired. The printhead 140 may eject a plurality of printing liquids of different colours and may include different nozzles for ejecting different coloured printing liquids. The printhead 140 may also include different nozzles for ejecting printing liquid onto different areas of the printing medium. The printhead 140 may include means of capping the nozzles to prevent evaporation of the printing liquid, for example the printhead may include mechanical caps to cover an opening of a nozzle to prevent exposure to the external environment.

The printhead 140 may print onto the printing medium using printing liquid, which may be stored in a reservoir 120 until the printing liquid is to be used for printing of an image or for spitting. The reservoir 120 may contain a single printing liquid or several different printing liquids. The reservoir 120 may be sealed to protect the printing liquid from an external environment.

The printing system 100 may operate under the control of the processor 130. The processor 130 may control the printhead 140 to print an image on the printing medium by ejecting printing liquid through the nozzles of the printhead 140 as the printhead traverses across the printing medium.

The processor 130 may include a print job processing engine 132. The print job processing engine 132 may receive information relating to a print job from the network module 150, including at least one image to be printed, and provide an output to the printhead 140 to cause the desired print job to be printed to a print medium. Furthermore, the print job processing engine 132 may analyse the received print information to determine where to spit dots of ink onto the print medium to provide spit on page operation and control the printhead 140 to spit printing liquid a the determine positions.

According to some examples, the print job processing engine 132 analyses the received print job information to determine regions in which images or text, i.e. a desired output, are to be printed to a print medium and designate these regions as printing areas. Remaining areas which are not associated with the desired printing output are then designated as non-printing areas. Generally, print jobs contain space between different images to facilitate finishing processes, etc, providing non-printing areas between the images.

The print job processing engine 132 is operable to create a spit on page dot pattern that is applied to the non-printing areas and not to the printing areas In some examples, this is achieved by performing an overlay merge of a layer containing the printing areas, including the received images or text, over a layer containing the spit on page dot pattern to cover the spit on page dot pattern in the printing areas. The print job processing engine 132 then generates a print output file comprising the at least one image and the spit on page dot pattern in the non-printing areas.

This results in spit on page dots being printed in the areas designated as non-printing areas as required to avoid a nozzle of the printhead 140 exceeding a certain decap time. However, no spit on page dots are printed in the areas designated as printing regions in which the at least one image is printed to the print medium. In this way, artefacts in the finished printed product may be reduced or avoided.

The printing system 100 of FIG. 1 may be, for example, an inkjet printing system, a dye sublimation printing system or a piezoelectric printing system. The skilled person would understand that the example printing system 100 and the following methods disclosed herein should not be limited to a particular type of printing system, but may be applied to any printing system which uses printing liquid susceptible to evaporation and nozzles which may be maintained by ejecting printing liquid.

Figure 2:
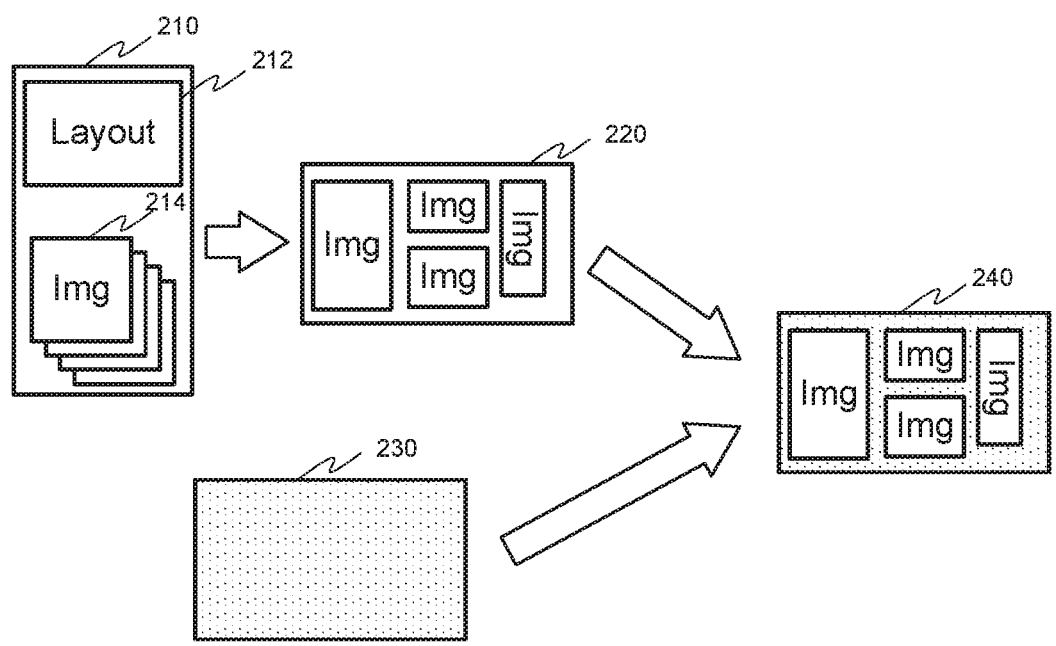
FIG. 2 shows a compositing process for generating print jobs according to an example of the disclosure.

FIG. 2 illustrates an example compositing processes for generating a print output file with spit on page dots limited to non-printing areas. Print job information 210 comprises a layout description 212 and one or more images 214. Based on the layout information 212, the print job processing engine 132 arranges the one or more images 214 in an image layer 220. A spit on page background layer 230 is provided with a dot pattern for spit on page operation of the nozzles of the printhead 140. The dot pattern may be generated based on the allowable decap times of individual nozzles in the printhead 140, based on stored patterns, or any other method.

The print job processing engine 132 then rasterizes the two layers into a single output file 240 with the image layer 220 overlying the spit on page layer 230. Thus, the spit on page dots of background layer 230 are only visible in non-printing areas of the rendered output 240 where no printed output is defined in the layout file 212.

The skilled person will recognize that more than two layers may be used, for example, the layout 212 may define a plurality of layers each containing one or more images to be composited on top of a background spit on page layer 230 into the output file to result in a desired printed output with spit on page restricted to non-printed areas.

The compositing described above in conjunction with FIG. 2 may be performed in the print job engine 132 operating on a processor 130 of a printing system. According to some examples, the compositing may be performed on an external user station, providing the print job engine functionality, coupled to a printing system and the output file including spit on page dots transmitted to the printing system to be rendered to a print medium. In such arrangements, a driver software may be loaded on to the user system and may comprise information relating to decap times for one or more nozzles of the printhead 140.

In some examples, a user system may transmit a print job to a print job engine located in a print server, which may be a cloud server. The print server may process the print job to generate a print output file in line with the compositing process of FIG. 2 and then forward the print output file including the spit on page dots to a printing system to be printed to a print medium.

Figure 3:
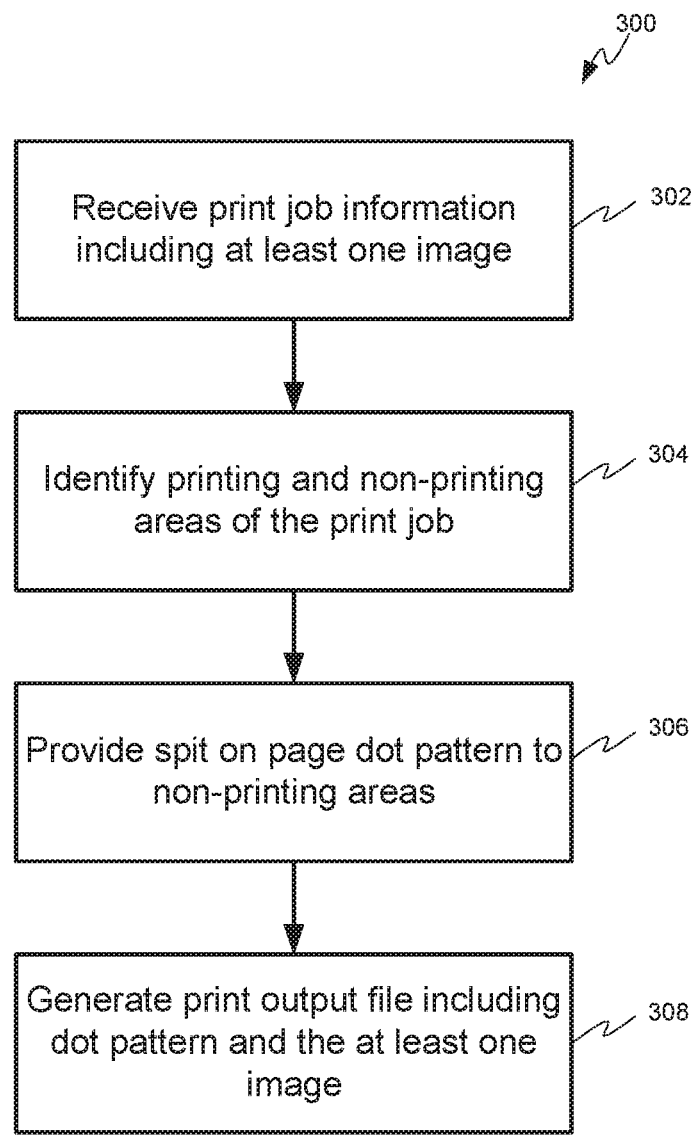
FIG. 3 shows a method according to an example of the disclosure.

FIG. 3 shows a method 300 according to an example of the disclosure. According to the method of FIG. 3, print job information including at least one image is received 302, for example via network module 150 by a print job engine processor 132. The print job engine processor 132 determines a printing area corresponding to a region containing the at least one image to be printed and a non-printing area corresponding to a remaining region, based on the received print job information. For the area determined to be the non-printing area, a dot pattern to provide spit on page operation is provided 306 by the print job engine processor 132. A print output file is then generated 308 comprising the spit on page dot pattern in the non-printed areas and the at least one image.

The print output file may then be transmitted to a printing apparatus to be printed to a print medium. In some examples, the print job engine may use the generated print output file to directly control a printhead and printing apparatus to print the at least one image to the print medium.

In some examples, the print job information may further include a layout description associated with the at least one image to define the layout of the printed areas of the print job.

Figure 4:
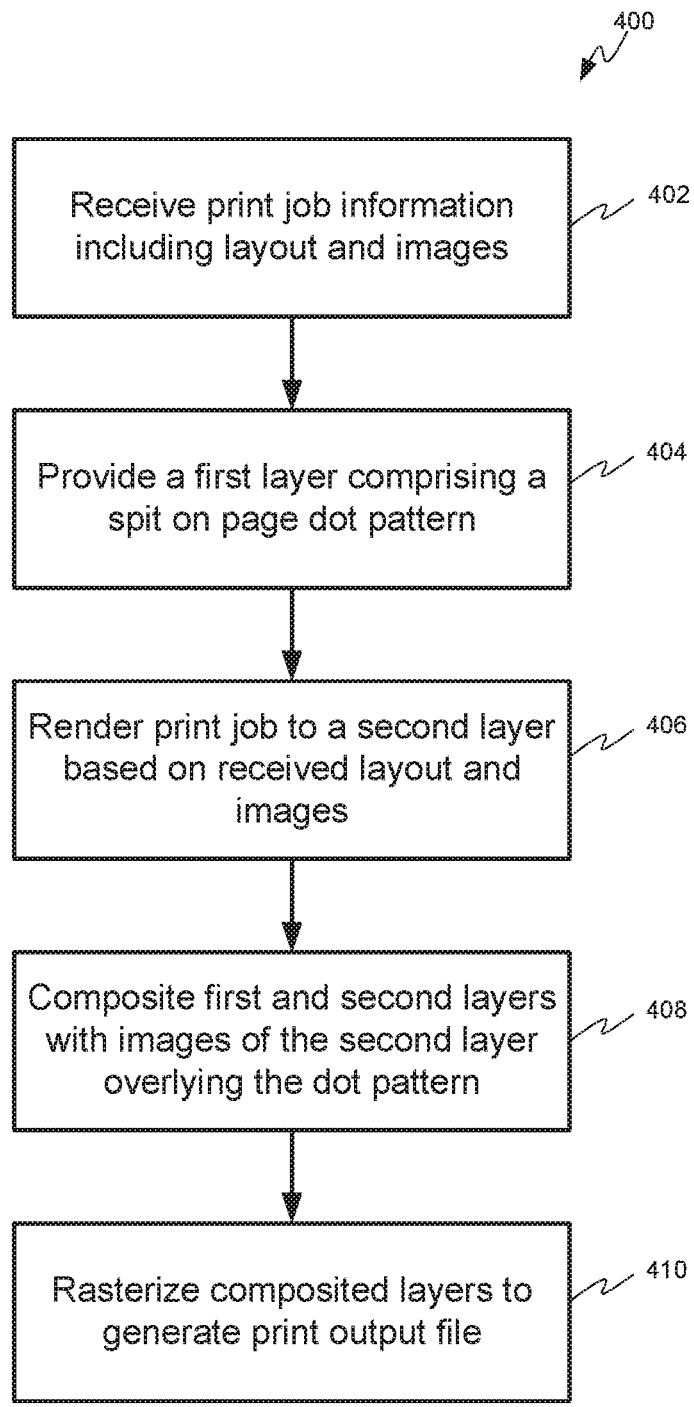
FIG. 4 shows another method according to an example of the disclosure.

FIG. 4 shows a further method 400 according to an example of the disclosure. According to the method 400 of FIG. 4, print job information including a layout description and at least on image is received 402, for example at print job engine 132. A background layer 230 comprising a dot pattern for spit on page operation is provided 404, and the at least one image and layout description are rendered 406 to an image layer 220. The layers are composited 408 with the image layer 220 overlying the background layer 230 such that the dot pattern of the background layer 230 is covered by the at least one image of the image layer 220, while the dot pattern remains visible in other areas not associated with the at least one image. The composited layers are then rasterized 410 to generate a print output file that can be used to control a printhead 140, or transmitted to a print apparatus, to be printed to a print medium.

The skilled person would understand that the printhead or printhead nozzle "spitting" printing liquid could be referred to as the printhead or printhead nozzle "ejecting", "firing" or "depositing" printing liquid.

The skilled person would understand that while this disclosure has been described with reference to components of a typical 2D printing system, the disclosure could equally be applied to a 3D printing system or any other type of printing system provided implementing spit on page to avoid problems with decap of nozzles.

Figure 5:
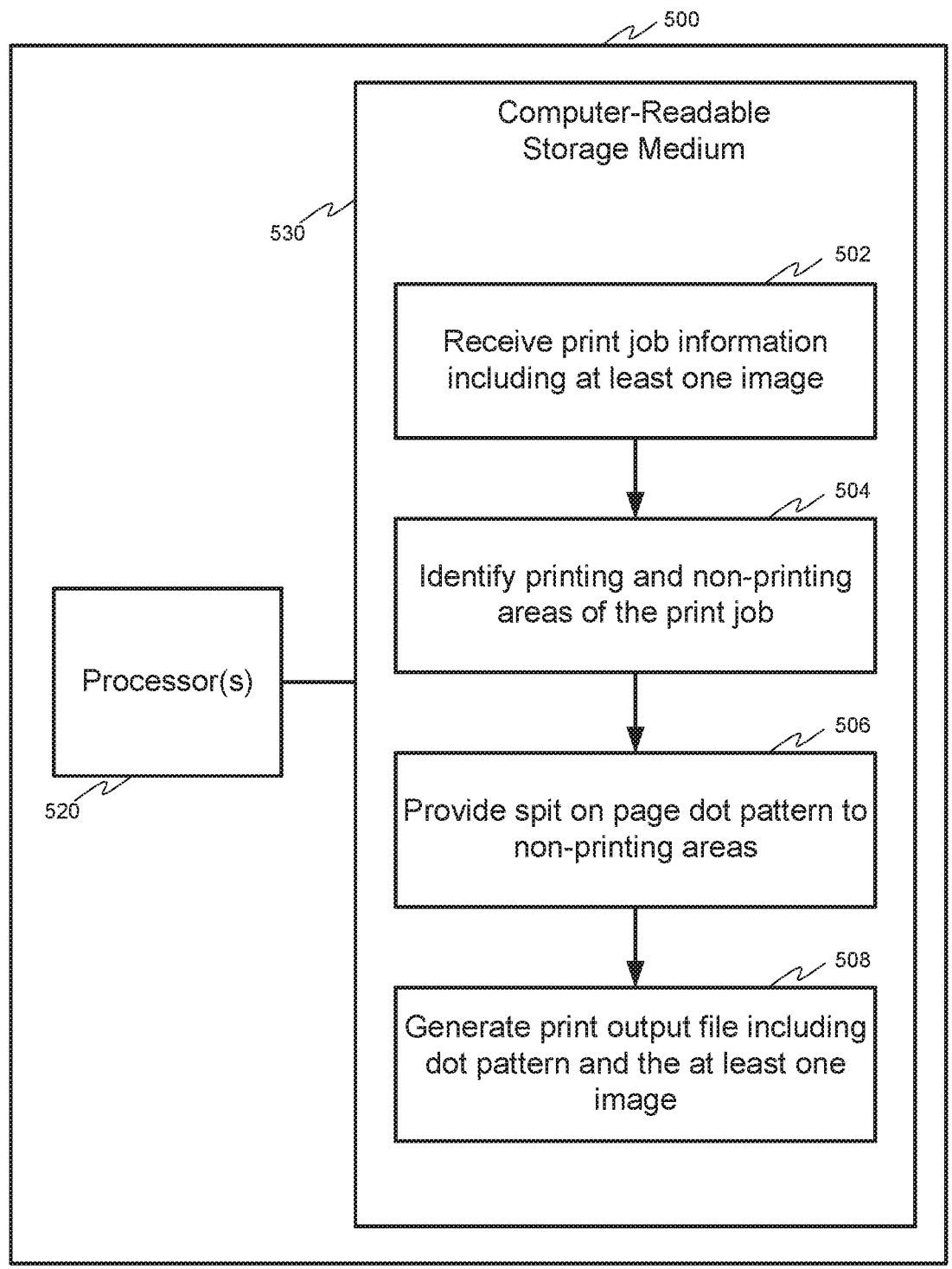
FIG. 5 is a schematic block diagram of a computer system according to an example of the disclosure.

Certain methods and systems as described herein may be implemented by one or more processors that processes program code that is retrieved from a non-transitory storage medium. FIG. 5 shows an example 500 of a device comprising a computer-readable storage medium 530 coupled to at least one processor 520. The computer-readable media 530 can be any media that can contain, store, or maintain programs and data for use by or in connection with an instruction execution system. Computer-readable media can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory, or a portable disc.

In FIG. 5, the computer-readable storage medium comprises program code to: receive 502 print job information including at least one image, determine 504 a printing area corresponding to a region containing the at least one image to be printed and a non-printing area corresponding to a remaining region based on the received print job information, provide 306 a dot pattern for spit on page operation to areas identified as non-printing areas, and. Generate 508 a print output file comprising the spit on page dot pattern in the non-printed areas and the at least one image.

All of the features disclosed in this specification (including any accompanying claims, abstract, and drawings) may be combined in any combination, except combinations where some of such features are mutually exclusive. Each feature disclosed in this specification, including any accompanying claims, abstract, and drawings), may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The invention claimed is:

1. A method of a system comprising a hardware processor, comprising:
    receiving at least one image to be printed;
    determining a printing area corresponding to a region containing the at least one image to be printed and a non-printing area corresponding to a remaining region, wherein the at least one image is not to be printed in the non-printing area;
    providing a first layer comprising a spit-on-page dot pattern for the non-printing area, the spit-on-page dot pattern being for a spit-on-page operation;
    providing a second layer comprising the at least one image for the printing area; and
    generating a print output file comprising the spit-on-page dot pattern and the at least one image, wherein the spit-on-page dot pattern of the first layer covers an entire output region of the print output file, wherein the generating of the print output file comprises compositing the first and second layers wherein the second layer overlies the first layer, and wherein the spit-on-page operation based on the print output file limits a spitting of spit-on-page dots according to the spit-on-page dot pattern to the non-printing area.

2. The method of claim 1, further comprising receiving a layout description associated with the at least one image, wherein the printing area is determined based on the layout description.

3. The method of claim 1, wherein the at least one image is included in print job information.

4. The method of claim 1, further comprising rasterizing the first and second layers to generate a single image for printing.

5. The method of claim 1, wherein the spit-on-page dot pattern of the first layer is based on allowable decap times of nozzles of a printhead.

6. The method of claim 5, further comprising providing the print output file to a printing apparatus to be printed to a print medium, wherein the printhead is part of the printing apparatus.

7. The method of claim 1, wherein the first layer comprising the spit-on-page dot pattern is a background layer.

8. A device to control a printing process, the device comprising:
a processor; and
a non-transitory storage medium storing instructions executable on the processor to:
receive at least one image to be printed;
determine a printing area corresponding to a region containing the at least one image to be printed and a non-printing area corresponding to a remaining region, wherein the at least one image is not to be printed in the non-printing area;
provide a first layer comprising a spit-on-page dot pattern for the non-printed area, the spit-on-page dot pattern being for a spit-on-page operation;
provide a second layer comprising the at least one image for the printing area; and
generate a print output file comprising the spit-on-page dot pattern and the at least one image, wherein the spit-on-page dot pattern of the first layer covers an entire output region of the print output file, wherein the generating of the print output file comprises compositing the first and second layers wherein the second layer overlies the first layer, and wherein the spit-on-page operation based on the print output file limits a spitting of spit-on-page dots according to the spit-on-page dot pattern to the non-printing area.

9. The device of claim 8, wherein the at least one image is included in print job information.

10. The device of claim 8, wherein the instructions are executable on the processor to:
receive a layout; and generate the second layer by positioning the at least one image based on the layout.

11. The device of claim 8, wherein the instructions are executable on the processor to:
rasterize the first and second layers into a single image for printing.

12. The device of claim 8, wherein the spit-on-page dot pattern of the first layer is based on allowable decap times of nozzles of a printhead.

13. The device of claim 12, wherein the instructions are executable on the processor to transmit the print output file to a printing apparatus for printing to a substrate, and wherein the printhead is part of the printing apparatus.

14. A printing apparatus comprising the device of claim 8 and further comprising a print engine for printing the print output file to a print medium.

15. The printing apparatus of claim 14, wherein the print engine comprises a dye sublimation printer.

16. A non-transitory machine-readable storage medium comprising instructions that upon execution cause a system to:
receive at least one image to be printed;
determine a printing area corresponding to a region containing the at least one image to be printed and a non-printing area corresponding to a remaining region, wherein the at least one image is not to be printed in the non-printing area;
provide a first layer comprising a spit-on-page dot pattern for the non-printing area, the spit-on-page dot pattern being for a spit-on-page operation;
provide a second layer comprising the at least one image for the printing area; and
generate a print output file comprising the spit-on-page dot pattern and the at least one image, wherein the spit-on-page dot pattern of the first layer covers an entire output region of the print output file, wherein the generating of the print output file comprises compositing the first and second layers wherein the second layer overlies the first layer, and wherein the spit-on-page operation based on the print output file limits a spitting of spit-on-page dots according to the spit-on-page dot pattern to the non-printing area.

17. The non-transitory machine-readable storage medium of claim 16, wherein the instructions upon execution cause the system to:
rasterize the first and second layers into a single image for printing.

18. The non-transitory machine-readable storage medium of claim 16, wherein the instructions upon execution cause the system to:
receive a layout and
generate the second layer by positioning the at least one image based on the layout.

19. The non-transitory machine-readable storage medium of claim 16, wherein the spit-on-page dot pattern of the first layer is based on allowable decap times of nozzles of a printhead.

* * * * *